Nov. 25, 1930.  C. A. NORGREN  1,782,741
LUBRICATING DEVICE FOR PNEUMATICALLY OPERATED TOOLS
Filed Aug. 2, 1927
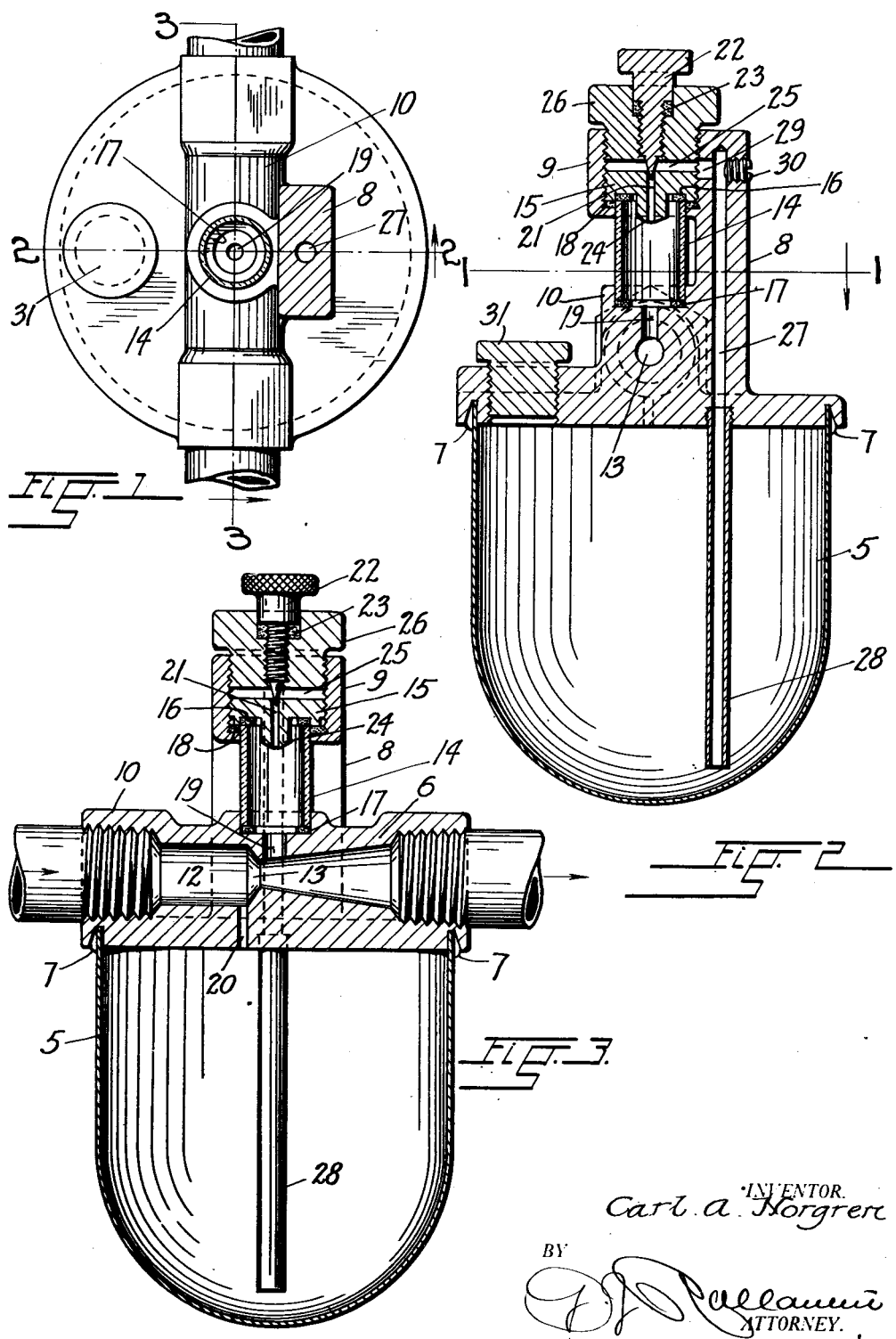

Patented Nov. 25, 1930

1,782,741

UNITED STATES PATENT OFFICE

CARL A. NORGREN, OF DENVER, COLORADO

LUBRICATING DEVICE FOR PNEUMATICALLY-OPERATED TOOLS

Application filed August 2, 1927. Serial No. 210,114.

This invention relates to lubricating devices for pneumatically operated tools and its main object resides in providing a simple appliance which in connection with the air line of a pneumatic tool, automatically supplies a lubricant to the air in proper quantities for the lubrication of the parts of the tool with which the air comes in contact.

Another object of the invention is to provide in an appliance of the above described character, a sight tube which permits of observing the oil feed to the air line.

A further object is to provide a simple adjustment by which the oil supply may be regulated at will and still another object resides in the provisions of a lubricating device which is automatic in its operation to the extent of automatically supplying the lubricant to the feed line by the flow of air to the tool and of automatically discontinuing the supply when the flow of air is stopped.

Other objects of the invention, residing in details of construction and novel arrangements and combinations of parts will be fully brought out in the course of the following description.

In the accompanying drawings in which like characters of reference designate corresponding parts in the three views, Figure 1 represents a sectional plan view of my improved lubricator in the plane indicated by the line 1—1 in Figure 2, Figure 2, a section taken on the line 2—2, Figure 1, and Figure 3, a section along the line 3—3, Figure 1.

The lubricator comprises a cup 5 constituting the source of lubricant, which is closed at its top by a head 6 upon which the operative parts of the device are assembled. The edge of the cup is let into a circular groove in the under surface of the head and it is held in place by brazing as at 7.

A standard 8 formed integrally with the head has at its upper end an annular internally screw threaded boss 9 in axial alinement with the cup. The head has a transverse enlargement 10 which is bored longitudinally and shaped hexagonally at its ends.

The longitudinal passage 12 of the enlargement is screw threaded at its extremities for the attachment of the ends of the air line of the pneumatic tool where the line is broken to insert the lubricator, the portion of the passage between its screw ends is reduced in diameter at a point 13 in the vertical axis of the device and it is funnel shaped from the point of reduction to one of said ends for the production of a venturi action in the operation of the lubricator as will be explained hereinafter.

The boss 9 on the standard is flanged at its lower end and the opposed portion of the enlargement of the head is recessed for the application of a transparent sight tube 14. A gland 15 screwed into the threaded boss engages a gasket 16 at the upper end of the sight tube, and a second gasket 17 is disposed between the lower end of the tube and the breast of the recess.

A packing strip 18 surrounds the sight tube inside the boss and it will be seen that by screwing the gland down upon the tube, the ends of the latter are securely packed against leakage. The enlargement of the head is further provided with two vertical ducts one of which, 19, extending in the vertical axis of the device, connects the interior of the sight tube with the passage of the head at one side of its point of reduction, while the other duct 20 connects the passage at the opposite side of the same point with the interior of the cup or oil reservoir 5. The screw-gland has a vertical axial bore 21 connecting with the sight tube 14, and screwed into the boss 9 above the gland and in spaced relation thereto is a screw plug 26, carrying a needle valve 22.

The valve which extends through a screw threaded bore of the plug 26 has a pointed end that engages a seat at the upper end of the bore 21 of the gland and thereby controls the supply of lubricant to the sight tube 14.

A head at the upper end of the valve facilitates its rotary adjustment, and a packing 23 placed between the shank of the valve and a shoulder formed by an enlargement of the bore of the plug 26 prevents leakage around the valve. The bore 21 of the gland extends through a tip 24 of reduced diameter which at its lower end is tapered to the end of the bore.

The object of this taper is to prevent cohesion of oil discharged from the bore by capillary attraction and thereby cause the oil to drip through the sight tube into the duct 19, connecting with the passage 12 forming a part of the air line.

The space 25 between the gland 15 and the plug 26 connects with a longitudinal bore 27 of the standard and this bore communicates at its lower end with a pipe 28 which extends into the oil reservoir to a point in close proximity to the bottom thereof.

The connection between the upper end of the bore in the standard and the space 25 is established by a transverse hole 29 in the standard, the outer end of which is closed by means of a screw plug 30. This screw plug facilitates construction and permits of cleaning the various conduits included in the siphon line in case they become clogged by the oil passing through the line or by other obstructive matter.

A filler plug 31 screwed into an opening of the head 6 provides the means for supplying the lubricant to the cup.

In the operation of the lubricator the bore of the head is connected at opposite ends of a break in the air line of the pneumatic tool described hereinbefore and the cup is filled with a suitable lubricant through the filler opening normally closed by the plug 31.

It is to be understood that the device in its operative position is vertical with the cup lowermost as illustrated in the drawings. The compressed air moving through the passage of the head on its way to the tool in the direction of the arrows in Figure 2, produces a partial vacuum at the point of reduction in the passage 12 owing to its increased velocity as it passes said point, while before it reaches the point the air at its normal pressure is permitted to enter the oil cup through the duct 20.

By reason of the partial vacuum at the point of reduction and the consequent decrease of pressure in the communicating ducts and bores connecting with the pipe 28, which conjointly constitute the siphon line of the device, the direct air pressure upon the oil in the reservoir, will cause the oil to rise in the pipe and the bore of the standard and thence pass through the opening 29 and the space 25 into the bore 21 of the gland 15 whence it drips through the sight tube and the duct 19 into the passage 12 forming a part of the air line as explained hereinbefore.

The discharge of the oil is readily regulated by adjustment of the needle valve 22 and it will be seen that as long as the air remains flowing in the operation of a pneumatic tool to which the lubricator is applied, oil at a predetermined number of drops per minute will be constantly supplied to the air line to be carried by the air to the parts of the tool with which the air comes in contact.

It is equally obvious that when the operation of the tool is discontinued and the air stops flowing, the consequent equalization of pressures above the oil level in the reservoir, and in the siphon line will immediately stop the supply of oil and permit of the oil remaining in the siphon line to flow back to the reservoir.

The automatic operation of the lubricator, depending solely on the flow of air to the tool and the simple adjustment by which the supply of oil is regulated, provides for the positive and adequate lubrication of the parts of the tool without waste and without the necessity of manual adjustment of the lubricator each time the tool is put in operation or the operation thereof is discontinued and the sight tube provides the means for observing the operation of the lubricator and the quantity of lubricant supplied to the air line in a given period of time.

Having thus described my invention, what I claim and desire to secure by Letters Patent is:—

1. A lubricator of the character described comprising a reservoir, a head for the reservoir, providing a passage adapted for connection in an air line and having a bore to form part of a siphon line, the passage having a portion of reduced area to produce a partial vacuum by the flow of air through the air line and the head having a duct connecting the passage with the reservoir above its liquid level and a second duct to connect the passage with the siphon line, a pipe extending from the bore to the bottom portion of the reservoir and conductive means between the second duct and the bore.

2. A lubricator of the character described comprising a reservoir, a head for the reservoir, providing a passage adapted for connection in an air line and having a bore to form part of a siphon line, the passage having a portion of reduced area to produce a partial vacuum by the flow of air through the air line and the head having a duct connecting the passage with the reservoir above its liquid level and a second duct to connect the passage with the siphon line, a pipe extending from the bore to the bottom portion of the reservoir and conductive means including an upright sight tube between the second duct and the bore.

3. A lubricator of the character described comprising a reservoir, a head for the reservoir formed with a bored standard and an annular screw threaded boss on the standard interiorly connected with the bore thereof, the body portion of the head having a passage adapted for connection in an air line and having a point of reduced area to produce a partial vacuum by the flow of air through the air line, and the head having furthermore, a duct connecting the passage with the reservoir above its liquid level and a second duct to connect the passage with a siphon line of which the bore in the standard is a part, a packed sight tube between the boss and the head in connection with the second duct, a gland in the boss, having a bore connecting the interior of the boss with the sight tube, a plug in the boss, spaced from the gland, a valve on the plug, controlling the bore of the gland, and a pipe extending from the bore of the standard to the bottom portion of the reservoir.

4. A lubricator of the character described comprising a reservoir, a head for the reservoir formed with a bored standard and an annular screw threaded boss on the standard interiorly connected with the bore thereof, the body portion of the head having a passage adapted for connection in an air line and having a point of reduced area to produce a partial vacuum by the flow of air through the air line, and the head having furthermore, a duct connecting the passage with the reservoir above its liquid level and a second duct to connect the passage with a siphon line of which the bore in the standard is a part, a packed sight tube between the boss and the head in connection with the second duct, a gland in the boss, having a bore connected with the bore of the standard, a valve controlling the bore of the gland, and a pipe extending from the bore of the standard to the bottom portion of the reservoir.

5. A lubricator of the character described comprising a reservoir, a head for the reservoir formed with a bored standard and an annular screw threaded boss on the standard interiorly connected with the bore thereof, the body portion of the head having a passage adapted for connection in an air line and having a point of reduced area to produce a partial vacuum by the flow of air through the air line, and the head having furthermore, a duct connecting the passage with the reservoir above its liquid level and a second duct to connect the passage with a siphon line of which the bore in the standard is a part, a packed sight tube between the boss and the head, in connection with the second duct, a gland in the boss having a taper-ended tip in the sight tube and having a bore extending through the tip in connection with the bore of the standard, a valve controlling the bore of the gland, and a pipe extending from the bore of the standard to the bottom portion of the reservoir.

6. A lubricator comprising in combination with an air line, a reservoir below the line, a siphon line extending into the reservoir, a sight tube in the siphon line above the air line, a valve in the siphon line controlling the flow of liquid to the tube, and means to produce a partial vacuum in the siphon line by the flow of air through the line.

7. A lubricator comprising in combination with an air line, a reservoir below the line, a siphon tube connecting the air line with the reservoir, and a sight tube in the siphon line above the air line, the reservoir having an air inlet.

In testimony whereof I have affixed my signature.

CARL A. NORGREN.